(12) United States Patent
Vancleef et al.

(10) Patent No.: US 7,403,207 B1
(45) Date of Patent: Jul. 22, 2008

(54) INTENSITY WEIGHTING FOR SUB-PIXEL POSITIONING

(75) Inventors: Mark G. Vancleef, Portland, OR (US); Richard S. Arlint, Yacolt, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 468 days.

(21) Appl. No.: 11/192,958

(22) Filed: Jul. 29, 2005

(51) Int. Cl.
*G09G 5/02* (2006.01)
(52) U.S. Cl. ...................... 345/613; 345/606
(58) Field of Classification Search ................. 345/606, 345/613; 382/232
See application file for complete search history.

(56) References Cited

U.S. PATENT DOCUMENTS

| | | | |
|---|---|---|---|
| 5,175,808 | A | 12/1992 | Sayre |
| 5,430,555 | A * | 7/1995 | Sawada et al. ............... 382/232 |
| 6,636,216 | B1 | 10/2003 | Silverbrook |
| 6,670,965 | B1 | 12/2003 | McKeown |
| 6,819,333 | B1 | 11/2004 | Sadowski |
| 6,867,770 | B2 | 3/2005 | Payne |
| 6,894,702 | B2 | 5/2005 | Stamm |
| 6,897,870 | B1 | 5/2005 | Clegg |

* cited by examiner

*Primary Examiner*—Kee M. Tung
*Assistant Examiner*—Michelle K Lay
(74) *Attorney, Agent, or Firm*—Nathan O. Jensen; Kyle Eppele

(57) ABSTRACT

A method for determining intensity of a sub-pixel position within a pixelated image to enhance the image quality thereof. In a first step of this method information is received regarding a first pixel at a position X0,Y0, having an intensity I(X0,Y0). In a second step information is received regarding a second pixel at a position X1,Y0, where said second pixel is adjacent to and to the right of said first pixel. In third step, information is received regarding a third pixel at a position X0,Y1, where the third pixel is adjacent to and below the first pixel. In a fourth step information is received regarding a fourth pixel at a position X1,Y1, where the fourth pixel is adjacent to and to the right of the third pixel. A pixel value, I(X,Y), is then calculated where $I(X,Y) = (((N_x - (N_x*(X-X0)))*(N_y - (N_y*(Y-Y0)))*I(X0,Y0)) + ((N_x - (N_x*(X1-X)))*(N_y - (N_y*(Y-Y0)))*I(X1,Y0)) + ((N_x - (N_x*(X-X0)))* (N_y - (N_y*(Y1-Y)))*I(X0,Y1)) + ((N_x - (N_x*(X1-X)))* (N_y - (N_y*(Y1-Y)))*I(X1,Y1)))/(N_y*N_x)$, wherein the digital granularity is Nx per lateral pixel, Ny per vertical pixel and wherein X,Y is a sub-pixel position provided from an upper level system.

7 Claims, 3 Drawing Sheets

| I(A)=255 | 0 | 1 | 2 | 3 | 4 | 5 | 6 | 7 | 8 | I(B)=0 |
|---|---|---|---|---|---|---|---|---|---|---|
| 0 | 255 | 223 | 191 | 159 | 128 | 96 | 64 | 32 | 0 | |
| 1 | 223 | 195 | 167 | 139 | 112 | 84 | 56 | 28 | 0 | |
| 2 | 191 | 167 | 143 | 120 | 96 | 72 | 48 | 24 | 0 | |
| 3 | 159 | 139 | 120 | 100 | 80 | 60 | 40 | 20 | 0 | |
| 4 | 128 | 112 | 96 | 80 | 64 | 48 | 32 | 16 | 0 | |
| 5 | 96 | 84 | 72 | 60 | 48 | 36 | 24 | 12 | 0 | |
| 6 | 64 | 56 | 48 | 40 | 32 | 24 | 16 | 8 | 0 | |
| 7 | 32 | 28 | 24 | 20 | 16 | 12 | 8 | 4 | 0 | |
| 8 | 0 | 0 | 0 | 0 | 0 | 0 | 0 | 0 | 0 | |
| I(C)=0 | | | | | | | | | | I(D)=0 |

FIG. 4

INTENSITY WEIGHTING FOR SUB-PIXEL POSITIONING

BACKGROUND OF THE INVENTION

1. Field of the Invention

The present invention relates to image processing and image transformation and more particularly to improvements in determining sub-pixel position within a pixelated image.

2. Description of the Related Art

In computer graphics applications, source images are created and manipulated by a user to achieve a variety of effects. A user may, among other operations, rotate, invert, animate, distort, resize, color or combine images. A computer graphics or imaging system provides a tool to accomplish these operations.

Many upper level systems require the use of techniques to distort an image as required. As an example of this Head Up Display (HUD) systems for aircraft typically include a HUD projector (often embodied as an Overhead Unit (OHU) or in-dash unit) that projects symbology unto a combiner. It contains the light source for the display and the optical system that focuses the image to be viewed by the pilot at optical infinity. Because of the optical system, the pilot has the sense of viewing the displayed symbology through the combiner. This allows the pilot to focus vision well out in front of the airplane where other aircraft, terrain and other visual features can be noticed. However, the optical system has aberrations that are required to be adjusted for. There is a need to compensate for these display system distortions in order to produce a high quality image.

The prior art includes references to performing warping or distortion operations for image processing. For example, U.S. Pat. No. 5,175,808, issued to R. Sayre, entitled, "Method and Apparatus for Non-Affine Image Warping", discloses a method and apparatus for two-pass image transformation, providing a general solution to execute arbitrary warping of an image. A bicubic mesh is created, by splines or other suitable means, and is used to create displacement tables for X and Y displacement. Alternatively, the displacement tables can be generated directly. The displacement tables represent the movement of each pixel from an original location in the source image to a new location in the destination image. One of the displacement maps is applied to the source image to create an intermediate image and to the other displacement map to create a resampled displacement map. The resampled map is then applied to the intermediate image to create the destination image. By resampling, compensation for altered location points is done automatically. In this manner, no inversion of the underlying equations and functions is required.

U.S. Pat. No. 6,819,333, issued to G. Sadowski, entitled, "System and Method for Displaying An Image Using Display Distortion Correction", discloses a system for display distortion correction that includes a database that stores one or more pixel correction vectors and one or more sub-pixel correction vectors. The system also includes a buffer that receives and stores an input image data unit including a plurality of pixels. Furthermore, the system includes a system controller that is coupled to the database and to the buffer. The system controller generates a coarsely-corrected image data unit including a plurality of pixels by mapping one or more pixels of the coarsely-corrected image data unit to corresponding pixels of the input image data unit according to corresponding pixel correction vectors. Each pixel correction vector is associated with a particular pixel of the coarsely-corrected image data unit. The system also includes an interpolation filter that is coupled to the system controller and the database. The interpolation filter receives the coarsely-corrected image data unit and generates a finely-corrected image data unit using the coarsely-corrected image data unit and corresponding sub-pixel correction vectors.

In U.S. Pat. No. 6,670,965, issued to J. R. McKeown, entitled, "Single-Pass Warping Engine", a first scanline of an input image is spatially transformed into a first pixel sequence of an output image. Holes in the first sequence are interpolated if magnifying the input image. Overlapping pixels in the first sequence are adjusted if minifying the input image. After transforming the first scanline, a second scanline of the source image is transformed into a second pixel sequence of the output image. Holes in the second sequence are interpolated if magnifying the input image. Overlapping pixels in the second sequence are adjusted if minifying the input image. Overlapping pixels across the first and second sequences are adjusted and holes between the first and second sequences are interpolated if rotating the input image.

Another example is disclosed in U.S. Pat. No. 6,867,770, issued to B. A. Payne, entitled "Systems and Methods For Voxel Warping", that discloses systems and methods for calculating a modification of a geometrical shape by applying an inverse modification function to an array representing the shape. An array representing the geometrical shape is defined on a multi-dimensional space. A modification function is used to modify the geometrical shape. A user or a programmed computer can select the modification function. The computer applies an inverse of the modification function to the array. The computer deduces a change in the geometrical shape from the modified array.

As will be disclosed below, the present invention provides a specific technique for determining intensity of a sub-pixel position within a pixelated image to enhance the image quality thereof. This is provided as a single pass process that does not add latency.

SUMMARY OF THE INVENTION

In a broad aspect, the present invention is a method for determining intensity of a sub-pixel position within a pixelated image to enhance the image quality thereof. In a first step of this method information is received regarding a first pixel at a position X0,Y0, having an intensity I(X0,Y0). In a second step information is received regarding a second pixel at a position X1,Y0, where said second pixel is adjacent to and to the right of said first pixel. In third step, information is received regarding a third pixel at a position X0,Y1, where the third pixel is adjacent to and below the first pixel. In a fourth step information is received regarding a fourth pixel at a position X1,Y1, where the fourth pixel is adjacent to and to the right of the third pixel. A pixel value, I(X,Y), is then calculated where $I(X,Y)=(((Nx-(Nx*(X-X0)))*(Ny-(Ny*(Y-Y0)))*I(X0,Y0))+((Nx-(Nx*(X1-X)))*(Ny-(Ny*(Y-Y0)))*I(X1,Y0))+((Nx-(Nx*(X-X0)))*(Ny-(Ny*(Y1-Y)))*I(X0,Y1))+((Nx-(Nx*(X1-X)))*(Ny-(Ny*(Y1-Y)))*I(X1,Y1)))/(Ny*Nx)$, wherein the digital granularity is Nx per lateral pixel, Ny per vertical pixel and wherein X,Y is a sub-pixel position provided from an upper level system.

As will be disclosed in more detail below, this a single-pass process that minimizes latency.

BRIEF DESCRIPTION OF THE DRAWINGS

FIG. 4 is a spreadsheet showing how a group of four pixels are weighted to produce an intensity value in each of the "ideal" pixel locations that they border.

The same elements or parts throughout the figures of the drawings are designated by the same reference characters, while equivalent elements bear a prime designation.

DETAILED DESCRIPTION OF THE INVENTION

Figure 1:
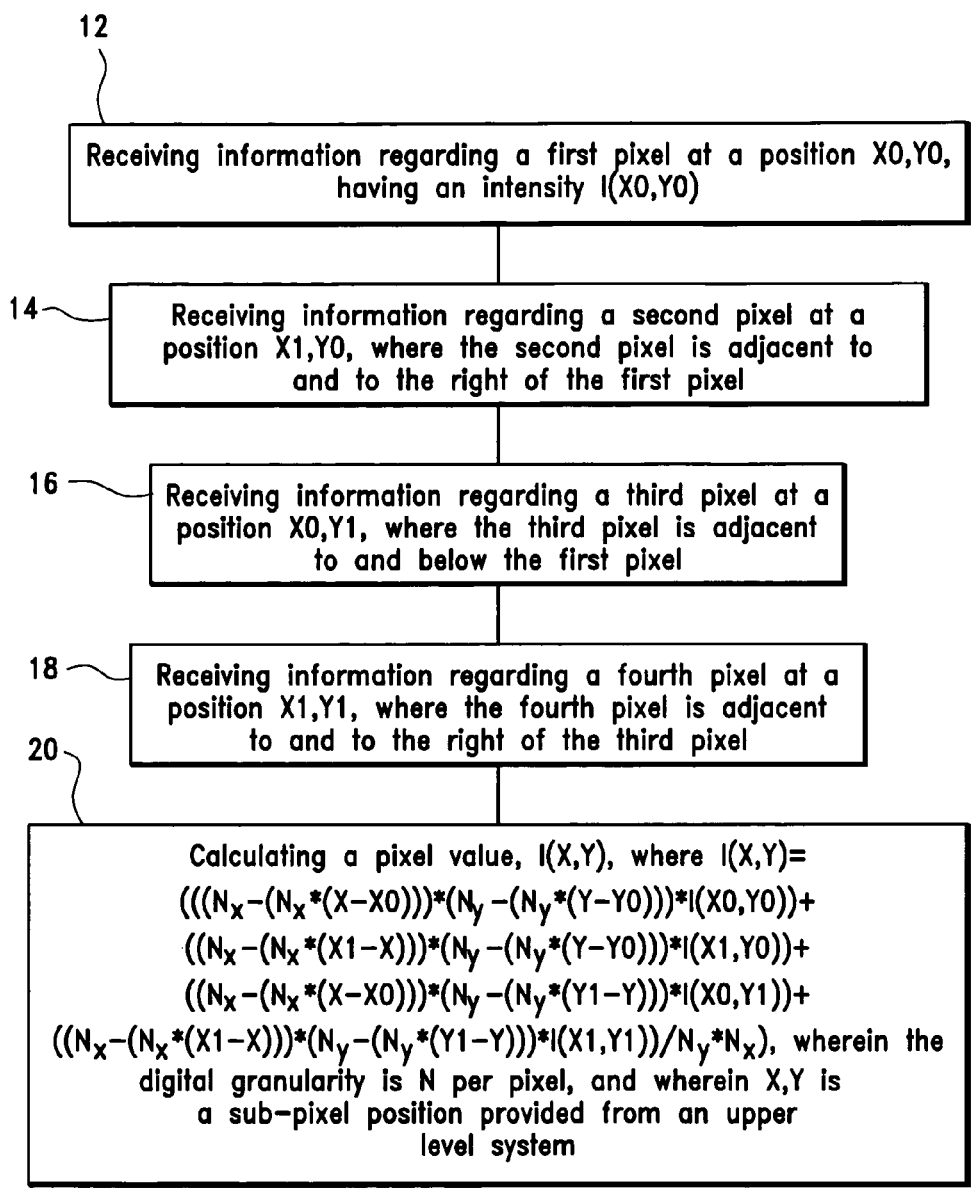
FIG. 1 is a flow diagram illustrating the method for determining intensity of a sub-pixel position within a pixelated image.

Referring now to the drawings and the characters of reference marked thereon, FIG. 1 illustrates the method for determining intensity of a sub-pixel position within a pixelated image, designated generally as 10. The first step in this process involves receiving information regarding a first pixel at a position X0,Y0, having an intensity I(X0,Y0), as noted by process block 12. X0 is the lateral position of the pixel within an array of pixels that typically forms the entire source image. Y0 is the vertical position of the pixel within this source image. I(X0,Y0) is the intensity of this pixel from the source image.

Information regarding a second pixel at a position X1,Y0, where the second pixel is adjacent to and to the right of the first pixel, is received (block 14). Information regarding a third pixel at a position X0,Y1, where the third pixel is adjacent to and below the first pixel is received (block 16). Information regarding a fourth pixel at a position X1,Y1, where the fourth pixel is adjacent to and to the right of the third pixel is received (block 18).

X is a lateral position between X0 and X1, and Y is a vertical position between Y0 and Y1.

In the general instance, a pixel value, I(X,Y), is calculated, where $I(X,Y)=(((Nx-(Nx*(X-X0)))*(Ny-(Ny*(Y-Y0)))*I(X0,Y0))+((Nx-(Nx*(X1-X)))*(Ny-(Ny*(Y-Y0)))*I(X1,Y0))+((Nx-(Nx*(X-X0)))*(Ny-(Ny*(Y1-Y)))*I(X0,Y1))+((Nx-(Nx*(X1-X)))*(Ny-(Ny*(Y1-Y)))*I(X1,Y1)))/(Ny*Nx)$, where the digital granularity is Nx per lateral pixel, Ny per vertical pixel, and where X,Y is a sub-pixel position provided from an upper level system (block 20).

If X and Y granularities are the same, a pixel value, I(X,Y), is calculated, where $I(X,Y)=(((N-(N*(X-X0)))*(N-(N*(Y-Y0)))*I(X0,Y0))+((N-(N*(X1-X)))*(N-(N*(Y-Y0)))*I(X1,Y0))+((N-(N*(X-X0)))*(N-(N*(Y1-Y)))*I(X0,Y1))+((N-(N*(X1-X)))*(N-(N*(Y1-Y)))*I(X1,Y1)))/(N*N)$, where the digital granularity is N per pixel, and where X,Y is a sub-pixel position provided from an upper level system (block 20).

Figure 2:
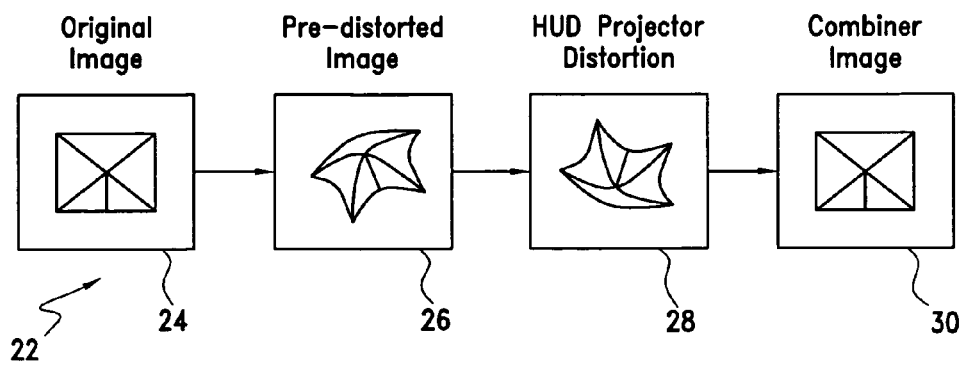
FIG. 2 is a diagrammatic illustration of an example of the mechanism in which an image is corrected to compensate for HUD Projector optical distortion such the resultant display image matches the original image.

Referring now to FIG. 2, an illustration of an example of the mechanism in which an image is corrected for distortion is illustrated, designated generally as 22. A pixelated original (or "source") image 24 is processed to produce a pre-distorted image 26. This source image 24 is provided by a suitable display generator. In present applicants' HUD example the display generator used is a graphics processor of the HUD computer. This source image 24 is processed by a suitable processor, for example, a programmable logic device such as a field-programmable gate array (FPGA). The processor uses a table to determine how to pre-distort the image. The pre-distorted image 26 compensates for the HUD Projector distortion and roll effects 28, so that when presented to the combiner of the HUD, a resultant combiner (or "destination") image 30 matches the original image. The distortion and roll effects are a characteristic of the optical system utilized. These may typically be determined by computer programs that can characterize the lens arrangement of the optical system.

Figure 3:
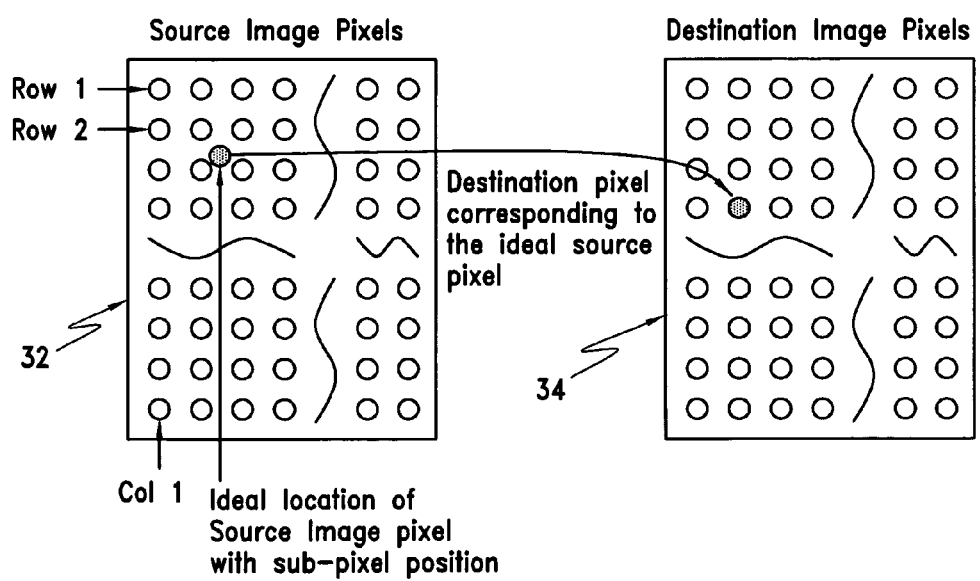
FIG. 3 is a diagrammatic illustration of an image, showing the mapping of source image pixels and destination image pixels.

Referring now to FIG. 3, a source image 32 and a destination image 34 are defined by a grid of pixel intensity values with the upper left pixel being row 1 and column 1. Column numbers are larger for pixels farther to the right. Row numbers are larger for pixels farther down. Processing starts with the first block of 4 pixels indicated by (row 1, column 1), (row 1, column 2), (row 2 column 1) and (row 2 column 2). A resulting intensity for the group of four pixels is calculated using the four source pixel intensities and the sub-pixel position.

Next, the resulting intensity is determined for the four pixels indicated by (row 1, column 2), (row 2, column 2), (row 1 column 3) and (row 2 column 3).

This processing continues moving to the right until the end of the row is reached. The next group of four pixels to be operated upon is the block of four pixels indicated by (row 2, column 1), (row 2, column 2), (row 3, column 1) and (row 3, column 2).

This process continues until all of the groups of pixels throughout the entire display have been processed.

Pixel weighting is intended to preserve source image information in the destination image when the distortion mapping does not align with physical pixel locations. The pixel weighting information in the distortion table indicates the distance from the physical source pixel location to an ideal source pixel location if the source image had more resolution. This distance information is used to create the ideal pixel intensity that is weighted based upon the distance from the four physical pixel intensities. The computed ideal pixel intensity is stored in the destination pixel location.

The spreadsheet of FIG. 4 shows how a group of 4 pixels are weighted to produce an intensity value in each of "ideal" pixel locations that they border. Given that the reverse distorted pixel is 5 columns to the right of and 2 rows below the source pixel I(A) which a value of 255, with all other pixels in the group being zero, the intensity of the destination pixel will be 72.

FIG. 4 uses a simplified distance calculation for ease of implementation in electrical circuitry:

$$\text{Intensity}=(((8-Dx))*(8-Dy))*I(A)+((Dx))*(8-Dy))*I(B)+((8-Dx))*(Dy))*I(C)+((Dx))*(Dy))*I(D))/64$$

As noted above, the principles of the present invention are applicable with respect to HUD projectors. In such an instance the resultant combiner image may be, for example, an SXGA image, SXGA Plus, HDTV standard or one with larger pixel grids.

As noted above, this is a single-pass process that minimizes latency. The entire predistorted image is built in a single pass of the source image without leaving holes, or undefined pixels in the pre-distorted image that would need to be determined by a second processing pass of the source image.

The present invention can be used in other applications where there is optical distortion required to be overcome. Other embodiments and configurations may be devised without departing from the spirit of the invention and the scope of the appended claims.

The invention claimed is:

1. A method for enhancing the quality of an image on a combiner of a Head Up Display (HUD) which has been distorted by optical aberrations of the optical components of the HUD, comprising the steps of:

a) determining intensity of a sub-pixel position within a pixelated source image that is desired to be reproduced on a combiner by gathering data from said pixelated source image, said step of gathering data, comprising the substeps of:
   i. receiving information from said pixelated source image regarding a first pixel at a position X0,Y0, having an intensity I(X0,Y0);
   ii. receiving information from said pixelated source image regarding a second pixel at a position X1,Y0, where said second pixel is adjacent to and to the right of said first pixel;
   iii. receiving information from said pixelated source image regarding a third pixel at a position X0,Y1, where said third pixel is adjacent to and below said first pixel;
   iv. receiving information from said pixelated source image regarding a fourth pixel at a position X1,Y1, where said fourth pixel is adjacent to and to the right of said third pixel; and,
   v. calculating a pixel value, I(X,Y), where I(X,Y)= (((Nx−(Nx*(X−X0)))*(Ny−(Ny*(Y−Y0)))*I(X0,Y0))+((Nx−(Nx*(X1−X)))*(Ny−(Ny*(Y−Y0)))*I(X1,Y0))+((Nx−(Nx*(X−X0)))*(Ny−(Ny*(Y1−Y)))*I(X0,Y1))+((Nx−(Nx*(X1−X)))*(Ny−(Ny*(Y1−Y)))*I(X1,Y1)))/(Ny*Nx), wherein the digital granularity is Nx per lateral pixel, Ny per vertical pixel and wherein X,Y is a subpixel position provided from said pixelated source image; and,
b) utilizing said I(X,Y) to set the intensity of a pixel in a predistorted image to provide an enhanced image, wherein latency is minimized.

2. The method of claim 1, wherein said pixelated source image is provided from a graphics processor of a HUD computer.

3. The method of claim 1, wherein said data from said pixelated source image is gathered by a programmable logic device.

4. A method for enhancing the quality of an image on a display device wherein said image has been created for a display of a different pixel resolution than the desired display device, comprising the steps of:
a) determining intensity of a sub-pixel position within a pixelated source image that is desired to be reproduced on a display of a different pixel resolution by gathering data from said pixelated source image, said step of gathering data, comprising the substeps of:
   i. receiving information from said pixelated source image regarding a first pixel at a position X0,Y0, having an intensity I(X0,Y0);
   ii. receiving information from said pixelated source image regarding a second pixel at a position X1,Y0, where said second pixel is adjacent to and to the right of said first pixel;
   iii. receiving information from said pixelated source image regarding a third pixel at a position X0,Y1, where said third pixel is adjacent to and below said first pixel;
   iv. receiving information from said pixelated source image regarding a fourth pixel at a position X1,Y1, where said fourth pixel is adjacent to and to the right of said third pixel; and,
   v. calculating a pixel value, I(X,Y), where I(X,Y)= (((Nx−(Nx*(X−X0)))*(Ny−(Ny*(Y−Y0)))*I(X0,Y0))+((Nx−(Nx*(X1−X)))*(Ny−(Ny*(Y−Y0)))*I(X1,Y0))+((Nx−(Nx*(X−X0)))*(Ny−(Ny*(Y1−Y)))*I(X0,Y1))+((Nx−(Nx*(X1−X)))*(Ny−(Ny*(Y1−Y)))*I(X1,Y1)))/(Ny*Nx), wherein the digital granularity is Nx per lateral pixel, Ny per vertical pixel and wherein X,Y is a sub-pixel position provided from said pixelated source image; and,
b) utilizing said I(X,Y) to set the intensity of a pixel in a resolution adjusted image to provide an enhanced image, wherein latency is minimized.

5. The method of claim 4, wherein said pixelated source image is provided from a graphics processor of a HUD computer.

6. A method for enhancing the quality of an image on a display device wherein said image has a different pixel shape than the desired display device, comprising the steps of:
a) determining intensity of a sub-pixel position within a pixelated source image that is desired to be reproduced on a display of a different pixel shape by gathering data from said pixelated source image, said step of gathering data, comprising the substeps of:
   i. receiving information from said pixelated source image regarding a first pixel at a position X0,Y0, having an intensity I(X0,Y0);
   ii. receiving information from said pixelated source image regarding a second pixel at a position X1,Y0, where said second pixel is adjacent to and to the right of said first pixel;
   iii. receiving information from said pixelated source image regarding a third pixel at a position X0,Y1, where said third pixel is adjacent to and below said first pixel;
   iv. receiving information from said pixelated source image regarding a fourth pixel at a position X1,Y1, where said fourth pixel is adjacent to and to the right of said third pixel; and,
   v. calculating a pixel value, I(X,Y), where I(X,Y)= (((Nx−(Nx*(X−X0)))*(Ny−(Ny*(Y−Y0)))*I(X0,Y0))+((Nx−(Nx*(X1−X)))*(Ny−(Ny*(Y−Y0)))*I(X1,Y0))+((Nx−(Nx*(X−X0)))*(Ny−(NY*(Y1−Y)))*I(X0,Y1))+((Nx−(Nx*(X1−X)))*(Ny−(Ny*(Y1−Y)))*I(X1,Y1)))/(Ny*Nx), wherein the digital granularity is Nx per lateral pixel, Ny per vertical pixel and wherein X,Y is a sub-pixel position provided from said pixelated source image; and,
b) utilizing said I(X,Y) to set the intensity of a pixel in a shape adjusted image to provide an enhanced image, wherein latency is minimized.

7. The method of claim 6, wherein said pixelated source image is provided from a graphics processor of a HUD computer.

* * * * *